United States Patent

[11] 3,604,631

[72] Inventor Berwyn E. Etter
 Box 11965, St. Petersburg, Fla. 33733
[21] Appl. No. 2,048
[22] Filed Jan. 12, 1970
[45] Patented Sept. 14, 1971

[54] WELDING AND CUTTING TORCH
 11 Claims, 8 Drawing Figs.

[52] U.S. Cl. ................................................ 239/414,
 239/416.2, 251/207, 137/625.19, 137/625.47
[51] Int. Cl. ..................................................... F23d 13/38
[50] Field of Search ........................................... 239/414,
 416.2, 416.3, 407, 408, 416.1, 418, 417.5, 422,
 413, 428, 569, 574, 586; 251/207; 137/625.19,
 625.47

[56] References Cited
 UNITED STATES PATENTS

| | | | |
|---|---|---|---|
| 373,710 | 11/1887 | Wiswell | 137/625.47 X |
| 400,275 | 3/1889 | Vogel | 251/207 X |
| 525,504 | 9/1894 | Motter | 137/625.47 X |
| 1,097,264 | 5/1914 | Reich | 239/414 X |
| 1,128,445 | 2/1915 | Henning | 251/207 X |
| 1,896,092 | 2/1933 | Mangiameli | 137/625.19 X |
| 1,989,468 | 1/1935 | Spencer | 239/414 |

FOREIGN PATENTS

| | | | |
|---|---|---|---|
| 119,698 | 10/1918 | Great Britain | 239/414 |

*Primary Examiner*—M. Henson Wood, Jr.
*Assistant Examiner*—Edwin D. Grant
*Attorney*—Zarley, McKee & Thomte ABSTRACT: A welding and cutting torch comprising a handle portion having a volume control valve rotatably mounted therein which is in communication with sources of industrial gas and oxygen. The volume control valve includes two valve portions which control the flow of gas and oxygen therethrough respectively. The two valve portions are coordinated with each other so that the operator can rotate the volume control valve to select the proper gas-oxygen mixture. The two valve portions are in communication with a master valve which permits preselected amounts of the gas-oxygen mixture to flow therethrough for lighting and heating operations. The master valve may also be moved to an "off" position to prevent the flow of gas-oxygen mixture therethrough. The master valve is connected to the torch nozzle or tip. The torch also includes an oxygen line which bypasses the volume control valve so that additional oxygen can be supplied to the nozzle or tip when cutting operations are to be performed.

PATENTED SEP 14 1971         3,604,631
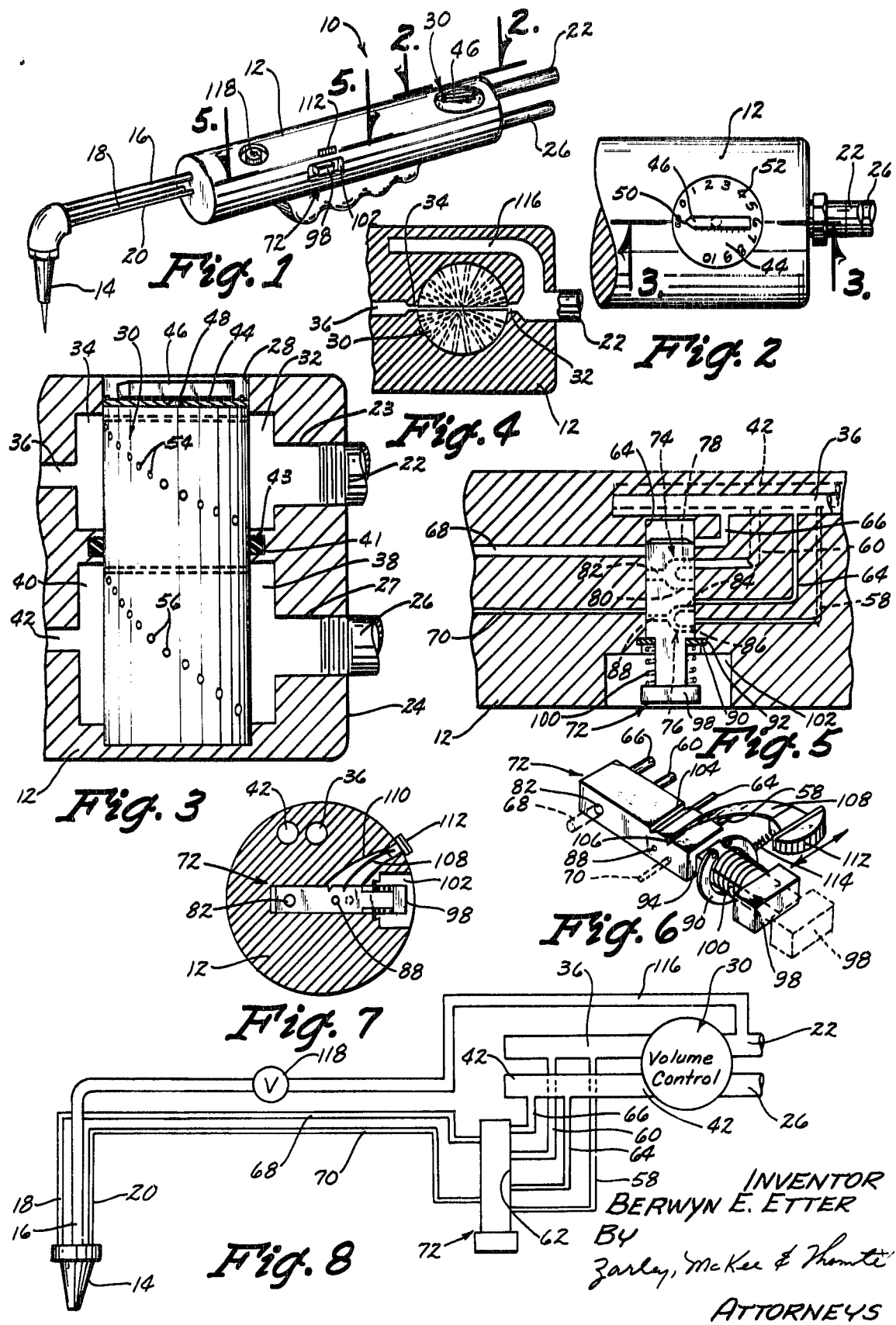
INVENTOR
BERWYN E. ETTER
BY
Zarley, McKee & Thomte
ATTORNEYS

WELDING AND CUTTING TORCH

Conventional cutting and/or welding torches generally employ at least two thumbscrew-type valves which are connected to sources of oxygen and acetylene and which must be individually operated in an attempt to obtain the desired flow therethrough. It is difficult and time consuming to coordinate the two valves so that the proper mixture and volume is achieved.

Therefore, it is the principal object of this invention to provide a cutting and welding torch having a volume control valve therein which coordinates the flow of oxygen and gas therethrough to obtain the proper oxygen-gas mixture.

A further object of this invention is to provide a cutting and welding torch which is ideally suited for use with the new types of industrial gas.

A further object of this invention is to provide a cutting and welding torch including a master valve which may be moved from "pilot" to "heat" positions.

A further object of this invention is to provide a cutting and welding torch including an oxygen line and valve imposed therein which bypasses the volume control valve to permit additional oxygen to be supplied to the torch nozzle.

A further object of this invention is to provide a cutting and welding torch which is convenient to use.

A further object of this invention is to provide a cutting and welding torch which is economical to manufacture and durable in use.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a perspective view of the torch of this invention.

FIG. 2 is a fragmentary plan view of the torch as seen on lines 2 — 2 of FIG. 1.

FIG. 3 is an enlarged sectional view as seen along lines 3—3 of FIG. 2.

FIG. 4 is a reduced sectional view as seen along lines 4—4 of FIG. 3.

FIG. 5 is an enlarged sectional view as seen along lines 5—5 of FIG. 1.

FIG. 6 is a perspective view of the master valve of the torch.

FIG. 7 is an enlarged sectional view as seen along lines 7—7 of FIG. 1.

FIG. 8 is a schematic drawing of the oxygen and gas flow lines.

The torch of this invention is generally designated by the reference numeral 10 and comprises generally a barrellike handle portion 12 connected to a tip or nozzle 14 by pipes 16, 18 and 20. An oxygen line 22 extends into opening 23 formed in end 24 of handle portion 12 and is connected to a suitable source of pressurized oxygen. A gas line 26 extends into opening 27 formed in end 24 of handle portion 12 and is connected to a source of pressurized industrial gas such as "Chemgas."

Handle portion 12 has a cylindrical bore 28 formed therein which extends downwardly thereinto as illustrated in FIG. 3 and which rotatably receives a volume control valve or mixture valve 30 therein. Handle portion 12 is provided with a small chamber 32 at one side of valve 30 (FIGS. 3 and 4) which communicates with opening 23. A chamber 34 is formed in handle portion 12 opposite chamber 32 at the other side of the valve 30 and communicates with bore 36 extending therefrom.

Handle portion 12 also has a chamber 38 formed therein at one side of valve 30 which is in communication with opening 27 (FIG. 3). Chamber 40 is provided in handle portion 12 opposite chamber 38 at the other side of the valve 30 and has a bore or conduit 42 extending therefrom. Handle portion 12 is provided with an annular groove 41 extending around the bore 28 which receives an O-ring seal 43 therein so as to sealably engage the exterior surface of valve 30 to prevent communication between compartments 32, 34 and 38, 40. Valve 30 is maintained in bore 28 by a disk 44 which is secured to handle portion 12 by any convenient means. A valve handle 46 is positioned above disk 44 and is connected to valve 30 by stem 48 to permit the operator to selectively rotate valve 30. One end of the handle 46 is provided with an indicator portion 50 thereon which indicates the relative position of valve 30 with respect to the indicia 52 on disk 44 to permit the operator to selectively position valve 30.

Valve 30 has a plurality of vertically spaced and staggered bores 54 extending therethrough above seal 43 and a plurality of vertically spaced and staggered bores 56 extending therethrough below seal 43 as illustrated in FIG. 3. Each of the bores 54 have different diameters with respect to each other. Likewise, each of the bores 56 have different diameters with respect to each other. The bores 54 are vertically spaced from each other and are rotatably offset with respect to each other so that the outer ends thereof define a helical pattern. The outer ends of the bores 54 are sufficiently offset from each other so that no more than one bore 54 will provide communication between chambers 32 and 34 at any time. The bores 56 are also vertically spaced from each other and are rotatably offset with respect to each other so that the outer ends thereof also display a helical pattern. The outer ends of the bores 56 are sufficiently offset from each other so that no more than one bore 56 will provide communication between chambers 38 and 40 at any one time. The bores 54 are coordinated with the bores 56 so that the operator may rotate the valve 30 to a particular position so as to achieve the proper gas-oxygen mixture passing through the valve 30. In other words, the operator will know that if the handle 46 is rotated to a certain number appearing on the disk 44, a bore 54 having a proper diameter will communicate with chamber 32 while a bore 56 having a proper diameter will communicate with chamber 38. In other words, rotation of valve 30 permits the flow of oxygen and gas therethrough to be coordinated so as to achieve the desired gas-oxygen mixture.

As seen in FIG. 8, lines 58 and 60 extend from bore 36 to one side of a rectangular compartment or chamber 62 and it can be seen that lines 64 and 66 extend from bore 42 to the same side of the compartment 62. FIG. 8 also illustrates the fact that the lines 58, 60, 64, and 66 enter the compartment 62 in a spaced-apart relationship. It should also be noted that lines 58 and 64 have a diameter less than the diameters of lines 60 and 66. A pair of spaced-apart lines 68 and 70 extend from the other side of compartment 62 entering communication with pipes 18 and 20 respectively. A rectangular master or a pilot valve 72 is slidably mounted in compartment 62 and has two conduits 74 and 76 extending therethrough, each of which are generally Y-shaped in configuration. For purposes of description, conduit 74 is comprised of passageways 78 and 80 which extend into one side of valve 72 and which join to communicate with passageway 82 extending through the opposite side of the valve 72. Conduit 76 is comprised of passageways 84 and 86 which extend into one side of valve 72 and which join to communicate with passageway 88 which extends through the opposite side of the valve 72. Valve 72 is maintained in compartment 64 by means of a snapring 90 being received in groove 92 and engageable with the shoulder 94 of the valve 72. As seen in FIG. 5, valve 72 includes a stem portion 96 which extends through the center of the snapring 90 and having a button portion 98 on its outer end. Spring 100 embraces stem 96 as illustrated in FIGS. 5 and 6 to yieldably urge valve 72 outwardly from the compartment 64. Button portion 98 is mounted in a recessed area 102 formed in handle portion 12 so as to provide convenient access to the same without interfering with the use of the torch.

Valve 72 includes a pair of spaced-apart notches 104 and 106 formed in its upper end thereof which are selectively engageable with a semiflexible dog 108 extending upwardly and outwardly therefrom in opening 110 formed in handle portion 112. A thumb button 112 is connected to the upper end of dog 108 and protrudes from panel portion 12 as illustrated in FIG. 1. Thumb button 112 and dog 104 are laterally slidably mounted in the opening 110 so that dog 108 may be moved laterally from the notches 104 and 106 as desired. Spring means 114 is connected to the handle portion 12 and to the dog 108 to normally urge dog 108 to the left as viewed in FIG. 6 to yieldably resist the movement of the dog 10 to the right as viewed in FIG. 6.

A bypass line 116 is connected to line 22 and bypasses the volume control valve 30 as illustrated in FIG. 8. Line 116 is connected to a manually operated pushbutton-type valve 118 which is connected to the pipe 16. Valve 118 is normally closed but is adapted to supply additional oxygen to the tip 14 when opened so as to provide sufficient oxygen for cutting operations.

The normal method of operation is as follows. Lines 22 and 26 would normally be connected to a suitable pressure regulator means on the sources of oxygen and gas so as to deliver the oxygen and gas to the volume control valve 30 at a predetermined pressure. The indicia 52 on disk 44 would have previously been calibrated so that the operator could rotate valve handle 46 to the proper number depending upon the particular cutting or welding operation to be performed. In other words, if the operator rotates valve handle 46 to the number "4" on the disk 44, oxygen and gas will flow through the volume control valve 30 at a predetermined rate. Oxygen flows through line 22, opening 23, chamber 32, the bore 54 which is in communication with chamber 32, chamber 34 and into line 36. Similarly, the gas will flow through line 26, opening 27, chamber 38, through the bore 56 which is in communication with chamber 38, chamber 40 and into line 42. Oxygen will be supplied to the valve 72 through lines 58 and 60 while gas will be supplied to valve 72 through lines 64 and 66. When valve 72 is in its outermost position with respect to compartment 64 the flow of oxygen and gas to the nozzle is prevented since the passageways 82 and 88 are not registering with the lines 68 and 70. In the position of FIG. 5, the dog 108 is out of engagement with both of the notches 104 and 106 and would be positioned to the right of the valve 72. The torch may be lighted by pushing the valve 72 inwardly into compartment 64 to its "pilot" position wherein dog 108 will slidably move into engagement with notch 104 to maintain the valve in such position. When dog 108 is in engagement with notch 104, passageways 84 and 86 register with lines 64 and 58 respectively while passageway 88 registers with line 70. Gas and oxygen flow through the lines 64 and 58, through conduit 76, through line 70, through pipe 20 and outwardly through the nozzle 14 where it can be ignited. The reduced diameter of the lines 64 and 58 restrict the flow of oxygen and gas therethrough so that only a small flow of oxygen and gas will be supplied to the nozzle to permit the torch to be ignited. The valve 72 is also movable to a "heat" position wherein dog 108 will deflect upwardly out of engagement with notch 104 and will engage the notch 106. In the "heat" position, valve 72 is positioned so that passageways 78 and 80 will register with lines 66 and 60 respectively while passageway 82 registers with line 68. The larger diameters of the lines 66, 60 and 68 permits a greater volume of oxygen and gas to pass to the tip 14 so that heating or welding operations may be performed. When valve 72 is in its "heat" position, additional oxygen can be supplied to the tip 14 for cutting purposes by simply depressing the pushbutton valve 118 which causes oxygen to flow through the line 116 and pipe 16 to the nozzle 14. The torch may be shut off by simply sliding the thumb button 112 to the right as viewed in FIG. 1 which causes the dog 108 to move out of engagement with the notch in valve 72 which permits the spring means 90 to move the valve 72 to the right as viewed in FIG. 6 to stop the flow of gas and oxygen to the nozzle.

The operator may conveniently change the oxygen and gas mixture being supplied to the nozzle at any time by simply rotating the valve 30 to a predetermined position. It can be seen that an extremely convenient and efficient torch has been provided which may be used for cutting or welding purposes and which permits the mixture of gas and oxygen being used to be conveniently selected. Thus it can be seen that the device accomplishes at least all of its stated objectives.

I claim:
1. A torch, comprising,
a handle portion having first and second openings formed therein adapted to be in communication with sources of pressurized oxygen and industrial gas respectively,
said handle portion having first and second spaced-apart chambers formed therein which are in communication with said first and second openings respectively,
said handle portion having third and fourth spaced-apart chambers formed therein which have first and second conduits in communication therewith,
a rotatable volume control valve means rotatably mounted in said handle portion having a first valve portion positioned between said first and third chambers and having a second valve portion positioned between said second and fourth chambers,
each of said first and second valve portions having a plurality of spaced-apart and offset bores formed therein to permit selective communication between said first and third chambers and between said second and fourth chambers, whereby the flow of gas and oxygen through said volume control valve can be coordinated,
a nozzle means having at least a conduit means extending therefrom,
a second valve means between said conduit means and said first and second conduits, said second valve means adapted to be movable from a first position wherein gas and oxygen will flow to said nozzle means, to a second position wherein gas and oxygen is prevented from flowing to said nozzle means.

2. The torch of claim 1 wherein said conduit means comprises third and fourth conduits which are in communication with said second valve means.

3. The torch of claim 2 wherein said second valve means is also movable to a third position wherein gas and oxygen is supplied to said nozzle means at a reduced rate for ignition purposes.

4. The torch of claim 3 wherein said fourth conduit has a diameter less than said third conduit and wherein the gas and oxygen mixture flows through said fourth conduit when said second valve means is in its "pilot" position.

5. The torch of claim 4 wherein the gas and oxygen mixture flows through said third conduit when said second valve means is in its said first position.

6. The torch of claim 1 wherein an oxygen bypass line extends between said first opening and said nozzle means, said bypass line having a manually operated valve means for supplying additional oxygen to the nozzle means for cutting purposes.

7. The torch of claim 1 wherein each of the bores in said first valve portion have a predetermined diameter and wherein each of the bores in said second valve portion have a predetermined diameter to permit said coordination of the flow of gas and oxygen therethrough.

8. The torch of claim 1 wherein said volume control valve means includes means thereon for indicating the relative position of said control valve means with respect to said first and second chambers.

9. A cutting torch, comprising,
a handle portion having a chamber,
a nozzle element on one end of said handle portion,
a first conduit extending through said handle to said nozzle element,
a second conduit extending through said handle to said nozzle element,
a valve element movably mounted in said handle portion and having first and second portions in communication with said first and second conduits, respectively; each portion of said valve having a plurality of passageways, with one each of said passageways in each portion adapted to register with said first and second conduits, respectively, upon selective positioning of said valve element, said passageways in each portion being of a different cross-sectional size, means adapted to connect said first and second conduits to sources of oxygen and industrial gas, respectively, whereupon oxygen and industrial gas can flow through said respective conduits upon the alignment of a passageway i5 one of said valve portions with said conduits by the movement of said valve element, and a control valve in said handle portion and in communication with said conduits to control the flow of oxygen and industrial gas therethrough.

10. The device of claim 9 wherein an oxygen bypass line extends around said valve element and is in communication with said source of oxygen and said nozzle element, and as control valve in said bypass line.

11. The device of claim 10 wherein said control valve includes means for passing varying amounts of industrial gas and oxygen to said nozzle for ignition and for cutting purposes.